United States Patent
Anthonis et al.

(10) Patent No.: US 10,005,472 B2
(45) Date of Patent: Jun. 26, 2018

(54) IDENTIFYING FORCES IN A INTERFACE BETWEEN A BODY AND A SUSPENSION OF A VEHICLE

(71) Applicants: Jan Anthonis, Haasrode (BE); Steven Gillijns, Halle (BE)

(72) Inventors: Jan Anthonis, Haasrode (BE); Steven Gillijns, Halle (BE)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 604 days.

(21) Appl. No.: 14/538,386

(22) Filed: Nov. 11, 2014

(65) Prior Publication Data
US 2016/0129915 A1 May 12, 2016

(51) Int. Cl.
| | |
|---|---|
| G06F 19/00 | (2018.01) |
| B60W 40/12 | (2012.01) |
| G01L 5/16 | (2006.01) |
| B60R 16/023 | (2006.01) |
| B60G 17/019 | (2006.01) |

(52) U.S. Cl.
CPC ........... B60W 40/12 (2013.01); B60G 17/019 (2013.01); B60R 16/023 (2013.01); G01L 5/16 (2013.01); *B60G 2204/11* (2013.01); *B60G 2204/112* (2013.01); *B60G 2401/12* (2013.01); *B60W 2420/22* (2013.01)

(58) Field of Classification Search
CPC ... B60W 40/12; B60W 2420/22; B60G 17/19; B60G 2204/11; B60G 2204/112; B60G 2401/12; B60R 16/023; G01L 5/16; B60C 2420/22

USPC ................................................ 702/42; 701/49
See application file for complete search history.

(56) References Cited

U.S. PATENT DOCUMENTS

| | | | |
|---|---|---|---|
| 5,979,218 A | 11/1999 | Biddle et al. | |
| 6,389,341 B1* | 5/2002 | Davis | B60G 17/0152 188/266.5 |
| 2007/0182207 A1* | 8/2007 | Nakaya | B62D 25/182 296/180.1 |
| 2009/0076742 A1 | 3/2009 | Xia et al. | |
| 2011/0035103 A1* | 2/2011 | Arenz | B60G 17/016 701/37 |

(Continued)

FOREIGN PATENT DOCUMENTS

| | | |
|---|---|---|
| CN | 101309824 A | 11/2008 |
| WO | WO03072376 A3 | 3/2004 |

OTHER PUBLICATIONS

Lourens et al "An augmented Kalman filter for force identification in structure dynamics", Mechanical Systems and Signal Processing 27, pp. 446-460 (2012).*

(Continued)

*Primary Examiner* — Dzung Tran
(74) *Attorney, Agent, or Firm* — Lempia Summerfield Katz LLC

(57) ABSTRACT

Forces in a vehicle interface between the suspension and a body are identified. Rather than using many or all strain gauges, some more easily and rapidly installed acceleration sensors are instead used to measure local deformation. To remove or reduce the effects of rigid-body motion captured by accelerometers, an inertial measurement unit is also used. The forces are estimated from a behavior model accounting for both rigid and flexible motions.

11 Claims, 2 Drawing Sheets

(56) References Cited

U.S. PATENT DOCUMENTS

| | | | |
|---|---|---|---|
| 2012/0013113 A1* | 1/2012 | Trenne | B62D 25/182 |
| | | | 280/849 |
| 2012/0046828 A1 | 2/2012 | Lanzilotta et al. | |
| 2013/0154553 A1* | 6/2013 | Steele | B60L 11/182 |
| | | | 320/108 |
| 2013/0238198 A1 | 9/2013 | Prentice | |

OTHER PUBLICATIONS

European Search Report for European Application No. 15192719.1, dated Jul. 16, 2016.
S. P. McGuan, et al., "Flexible Vehicle Simulation or Modeling Vehicle Suspension Compliance at Ford Motor Co. Using a Coupling of ADAMS™ and MSC/NASTRAN™," SAE Technical Paper, pp. 1-12, 1994.
G. Manzilli, et al., "Vehicle modelling using an integrated FEM-multibody approach," pp. 1-8, 1994.
J. H. Park, et al., "Improving the vehicle dynamic performance by optimizing the body characteristics using body deformation analysis," pp. 253-266, 2010.
Chinese Search Report and Chinese Office Action for Chinese Application No. 201510763500.5, dated Oct. 10, 2017, with English Translation.

* cited by examiner

IDENTIFYING FORCES IN A INTERFACE BETWEEN A BODY AND A SUSPENSION OF A VEHICLE

BACKGROUND

The present embodiments relate to identifying forces in an interface between a body and a suspension of a vehicle. In particular, an arrangement of sensors and modeling are used to estimate forces.

In order to reduce fuel consumption, car manufacturers develop lighter, and hence more flexible, body structures. Modifications to the car body have an influence on vehicle dynamics performance. Nevertheless, there are still many unknowns. In order to design lighter car bodies while maintaining similar vehicle dynamics performance, car manufacturers look to forces acting in the interface between the suspension and the body for insight. These forces cannot be measured directly using transducers without altering the interface, so instead the forces are estimated.

To estimate the forces, strain gauges are mounted on the body of the car as close as possible to the connection points with the suspension. To obtain reliable results, the number of strain gauges to be instrumented equals at least three times the number of forces to be identified, such as having more than 200 strain gauges. A skilled technician may install approximately ten gauges a day, taking one technician around 20 days to instrument a car with strain gauges. Once installed, deformations are measured by the strain gauges in response to a controlled application of force, such as an impact hammer on the car body in a trimmed-body condition (i.e., without the suspension). Transfer functions from the force inputs to the strain responses are computed and assembled in a frequency-response-function (FRF) matrix, which is inverted. The suspension is added to the car body and handling maneuvers are performed on a test-track while strain data is measured. With the measured operational strain data and the inverted FRF matrix, the time-domain forces acting in the body-to-suspension interface are estimated. However, this approach results in high costs and a time frame that may not fit in the development cycle of the car.

SUMMARY

In various embodiments, systems, methods and computer readable media are provided for identifying forces in a vehicle interface. Rather than using many or all strain gauges, some more easily and rapidly installed acceleration sensors are instead used to measure local deformation. To remove or reduce the effects of rigid-body motion captured by accelerometers, an inertial measurement unit is also used. The forces are estimated from a behavior model accounting for both rigid and flexible motions.

In a first aspect, a system is provided for identifying forces in a vehicle interface. A plurality of strain gauges is positioned by connection points of a car body with a suspension. A plurality of accelerometers is positioned by the connection points. An inertial measurement unit connects with the car body. A processor is configured to estimate the forces at the connection points from a combined rigid-flexible car body model and input signals from the strain gauges, accelerometers, and inertial measurement unit.

In a second aspect, a non-transitory computer readable storage medium has stored therein data representing instructions executable by a programmed processor for identifying forces in a vehicle interface. The storage medium includes instructions for: receiving information over time from a rigid body sensor and flexible body sensor on a car body, the information being obtained during handling of a vehicle of the car body; combining the information into a state machine implemented by the programmed processor, the state machine comprising a behavior model of the car body; and identifying forces from a suspension on the car body in response to the handling with the state machine.

In a third aspect, a method is provided for identifying forces in a vehicle interface. The forces at the vehicle interface are modeled using at least three types of sensors including strain gauges and accelerometers at connection points between a suspension and a car body and including an inertial measurement unit. Signals are received by a computer from the sensors. The forces are estimated, by the computer, by input of the signals to the modeling.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

Three types of sensors are employed instead of one type for estimating forces at an interface between a car body and a suspension. As many strain gauges as possible may be replaced with DC accelerometers. The number of strain gauges required for estimating the forces acting in the interface may be reduced by a factor of three. A combined rigid-flexible car body model is used to estimate the forces from sensor signals. The time and cost for force identification may be reduced as compared to using many strain gauges.

Figure 1:
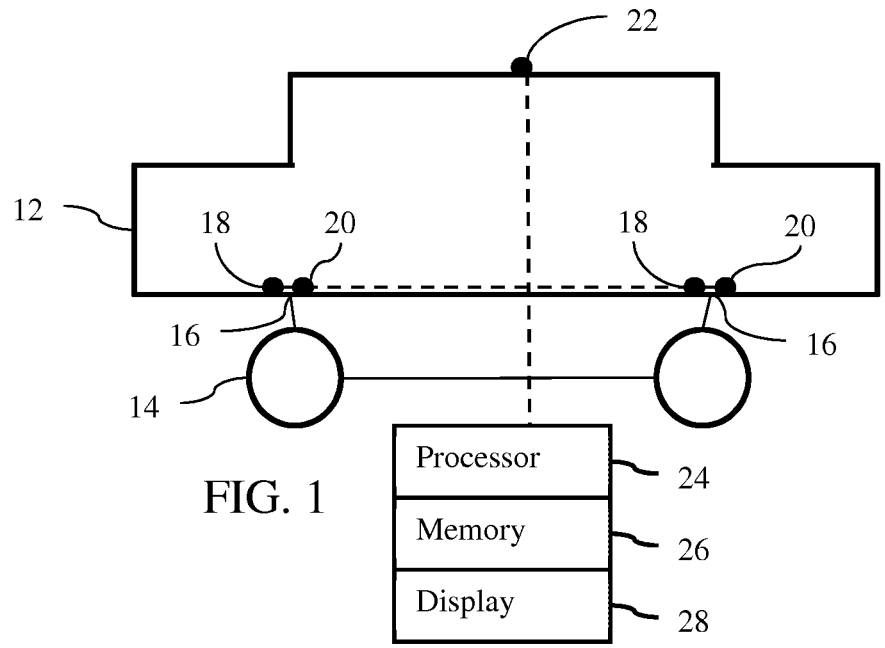
FIG. 1 illustrates one embodiment of a system for identifying forces in a vehicle interface.

FIG. 1 shows one embodiment of a system for identifying forces in a vehicle interface. The system includes a vehicle represented in two parts—a car body 12 and a suspension 14. Other vehicles, such as train cars, motorcycles, tricycles, or aircraft may be used. Other divisions between two or more parts may be used.

The system also includes a processor 24, a memory 26, and a display 28. The processor 24, memory 26, and display 28 are part of a computer, such as a laptop, tablet, personal computer, or workstation. In other embodiments, a server or other type of computer is provided. The computer is separate from the vehicle, such as being in a lab or office. In other embodiments, the computer is on or in the vehicle.

The system also includes three types of sensors, such as strain gauges 18, accelerometers 20, and an inertial measurement unit 22. Additional, different, or fewer types of sensors may be used, such as two or four types. Instead of an inertial measurement unit 22, global positioning sensor, gyroscope, accelerometer, or other rigid motion sensor may be used.

Additional, different, or fewer components may be provided for the system. For example, an input device, such as a network card, wireless transceiver, and/or user input device are provided. Various peripheral devices such as, for example, a disk storage device (e.g., a magnetic or optical disk storage device), a keyboard, a printing device, and a mouse, may be operatively coupled to the processor 24. As another example, other vehicle parts are provided.

The strain gauges 18 are a metal or conductive resistor responsive to compression or expansion (e.g., strain). A Wheatstone bridge or other circuit measures the resistance or change in resistance. The strain gauges 18 output electrical signals that vary with flexing of material, such as flexing of the car body at the location of the strain gauge 18.

The strain gauges 18, or at least the variable resistance portion of the strain gauges 18, are located by connection points 16 of the car body 12. The connection points 16 are where the suspension connects with the car body 12. For example, the strain gauges 18 are positioned on or adjacent to supports for the springs, shocks, or other suspension structures that connect with the car body 12.

Any number of strain gauges 18 is provided, such as about 70. About accounts for variation due to differences in connection points 16 for different vehicle designs and degrees of specificity desired. A strain gauge 18 is provided for each force of interest. In one example, about 70 forces are measured, so 70 strain gauges 18 are provided.

Only one strain gauge 18 is provided for each force or location. For a given force (e.g., strain or strain direction at a given location), a single strain gauge 18 is used instead of three or more. The forces to be output by the modeling determine the number of the forces. The signals from the strain gauges 18 allow the state machine used in the model to be observable. In alternative embodiments, two strain gauges 18 are provided for each force. Other ratios of strain gauge 18 to force may be provided.

The accelerometers 20 are piezoelectric, piezoresistive, or capacitive devices to convert mechanical motion into an electrical signal. In one embodiment, the accelerometers 20 are microelectromechanical devices. Single or multi-axis (e.g., 3 axes) accelerometers 20 may be used. The accelerometers 20 output an indication of motion or acceleration.

The accelerometers 20 operate over any given frequency range, such as being generally DC accelerometers 20. In one embodiment, the accelerometers 20 for measuring g-force applied during handling of the vehicle operate in the 0-5 Hz range. In another embodiment, the accelerometers 20 for measuring g-force applied during controlled force application (e.g., during trimmed-body conditions) of the vehicle operate in the 0-100 Hz range. Accelerometers 20 operable over any desired range of frequencies may be used, such as using the same accelerometers 20 operable from 0-100 Hz range for both trimmed-body and handling conditions. Other ranges may be used, such as ranges less than 200 Hz or less than greater ranges.

The accelerometers 20 are located by connection points 16 of the car body 12. For example, the accelerometers 20 are positioned against or near the strain gauges 18. In other embodiments, the accelerometers 20 are integrated with the strain gauges 18. The accelerometers 20 are positioned to respond to g-force or acceleration caused by local flexing (e.g., body deformation) and global rigid motion of the car body 18, so are positioned by or on the connection points 16. The strain gauges 20 measure only local deformation or at least do not measure global motion. Unlike the strain gauges 18, the accelerometers 20 not only measure acceleration due to the deformations, but also acceleration due to the rigid body motions. In alternative embodiments, the accelerometers 20 are positioned at locations subject to the force of interest whether by or on a connection point 16 or not.

Any number of accelerometers 20 is provided, such as about 70. About accounts for variation due to differences in connection points 16 for different vehicle designs and degrees of specificity desired. One accelerometer 20 is provided for each force. In one embodiment, only one accelerometer 20 is provided for each force or location. For a given force (e.g., strain or strain direction at a given location), a single accelerometer 20 is used instead of three or more. In alternative embodiments, two or more accelerometers 20 are provided for each force. More than one accelerometer 20 may be provided for each force, such as where the accelerometer 20 measures acceleration along fewer axes than the axes along with the force causes acceleration.

The inertial measurement unit 22 is a global positioning unit and a gyroscope and/or accelerometer. Other devices for measuring position, motion, and/or acceleration may be used, such as just a global or local positioning unit. Base stations or other non-satellite positioning structures may be used instead of global positioning. Any position accuracy may be provided, such as 1 cm accuracy.

The inertial measurement unit 22 is positioned on or in the car body 12. The position is away from the connection points 16 or locations for measuring local deformations. In order to extract information on the local deformations of the car body 12 from the accelerometer data, the inertial measurement unit 22 provides global or rigid body motion. Position or change in position over time may be used. The acceleration may be determined by the rate of change in position. The signal from the inertial measurement unit 22 is responsive to the overall motion of the car body 12. Using the absolute position, velocity, and/or acceleration of the center of gravity of the car body, the rigid motion may be removed from the motion sensed by the accelerometers 20. The removal is direct, such as altering the signals from the accelerometers 20, or indirect, such as using the rigid-body motion as an input to the model.

The inertial measurement unit 22 is connected by bolts, bonding, clamping, tape or other interaction to the car body 12. Glue, tape, clamping, bonding, or other interaction is used to hold the positioned strain gauges 18 and accelerometers 20 to the car body 12. The sensors are mounted on the body 12 of the car. The same or different form of attachment is used for the strain gauges 18 as the accelerometers 20.

The processor 24 is a general processor, application specific integrated circuit, field programmable gate array, graphics processing unit, digital signal processor, computer, server, circuit or combinations thereof. The processor 24 is a device for computing or implementing a model. In one embodiment, the model is implemented on a computer platform having hardware such as one or more central processing units (CPU), a random access memory (RAM), and input/output (I/O) interface(s). The computer platform also includes an operating system and microinstruction code. The various modeling or estimating processes and functions described herein may be either part of the microinstruction code or part of the program (or combination thereof) which is executed via the operating system. Alternatively, the processor 24 is one or more processors in a network.

A program may be uploaded to, and executed by, the processor 24. Likewise, processing strategies may include multiprocessing, multitasking, parallel processing and the like. The computer processing performed by the processor 24 may be implemented in various forms of hardware, software, firmware, special purpose processors, or a combination thereof. Some embodiments are implemented in software as a program tangibly embodied on a non-transitory program storage device. By implementing with a system or program, estimation of forces caused by the suspension 14 on the car body 12 is performed by the processor 24.

The processor 24 is configured to estimate one or more forces at connection points. The force or force vectors at any number of locations is estimated, such as estimating for about 70 forces.

The processor 24 estimates the forces from a combined rigid-flexible car body model and input signals from the sensors (e.g., from the strain gauges, accelerometers, and/or inertial measurement unit). Since a rigid-flexible car body model is used, the model itself removes the rigid motion information for the various connection points to estimate the flexing or local deformations caused by the suspension interface with the car body. The forces are estimated with cancellation of the rigid body motions using the signal from the inertial measurement unit in the rigid-flexible car body model. In alternative embodiments, the global or rigid body motion information is removed from the accelerator signals prior to application of the accelerator signals to the model. A flexible car body model without rigid motion may be used in this alternative.

The rigid-flexible car body model implemented by the processor 24 is a state estimator. The signals from the inertial measurement unit, accelerometers, and/or the strain gauges are input to the state estimator, and an estimate of the forces at the connection points is output. The state at a given time of the forces at the connection points is estimated. The states at different times may be estimated. Any state estimator may be used, such as a Kalman filter, other linear quadratic estimator, Bayesian model, a particle filter, a moving horizon, or other.

Figure 2:
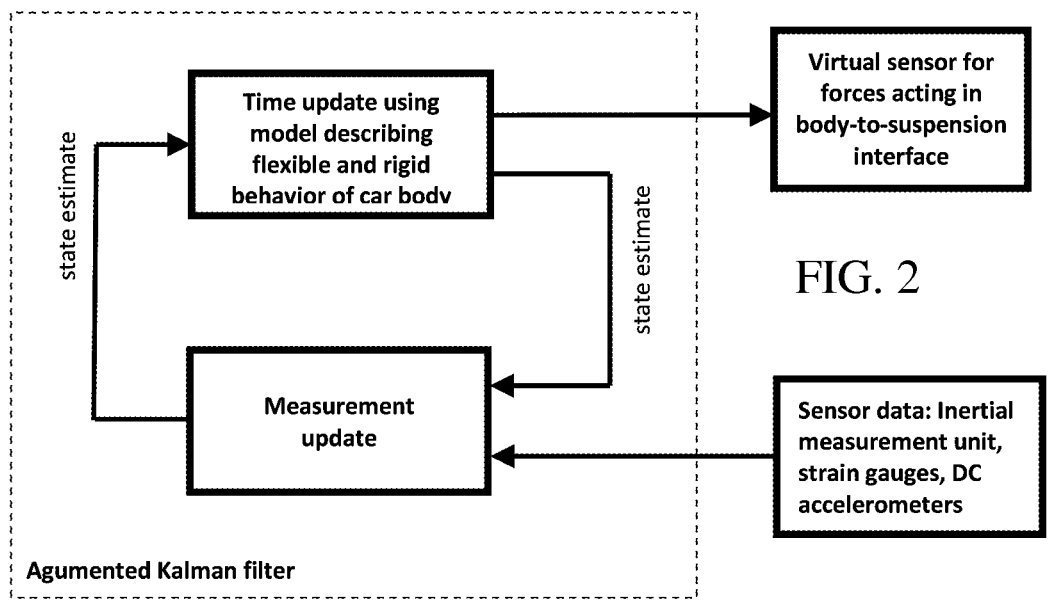
FIG. 2 shows one embodiment of a state machine for identifying forces in a vehicle interface.

In one embodiment, the state estimator is an augmented Kalman filter configured to estimate the forces from the input signals. The information provided by the inertial measurement unit, the accelerometers, and the strain gauges are combined into the augmented Kalman filter. As shown in FIG. 2, the Kalman filter employs the measurements (i.e., sensor data) acquired during the handling maneuver in the measurement update and employs a behavioral model of the car body during the time update. The result of each update is a state estimate of the forces. The output of the augmented Kalman filter are the estimated forces, expressed in FIG. 2 as virtual sensors.

The forces acting in the interface between car body and the suspension are inputs of the behavioral model. Since the traditional Kalman filter is a state estimator and not an input estimator, the augmented Kalman filter is used. The state vector is augmented with the unknown force. In this way, the force becomes a state that is estimated by the Kalman filter.

A "full vehicle" model (i.e., a model including not only the car body, but also suspension and tires) may be used. In this case, the interface forces are nonlinear functions of the states of the model. A Kalman filter or any other state estimator can be used. A "body-only" model may be used. In this case, the interface forces are unknown inputs of the model. Hence, an input estimator is needed. There are two options. "State augmentation" as discussed above is used. This transforms the unknown input into a state. A state estimator, such as augmented Kalman filter, or any other state estimator, is applied. The other option is to apply an input estimator.

The behavioral model describes both the rigid behavior (motion of the body as a whole) and flexible behavior (deformations of the body). To create the combined rigid-flexible car body model, input signals from the sensors (e.g., strain gauges and accelerometers) under controlled application or modeling of force are used.

In one embodiment, the flexible part of the combined rigid-flexible car body model is responsive to a frequency response function computed from signals of the accelerometers. In the trimmed body condition, frequency response function measurements are performed. The signals from the accelerometers and/or strain gauges are measured in response to force input from an impact hammer, shaker, or other source. In the trimmed body condition, the force is applied at the connection points without the suspension being attached. The force vector is controlled or known. For the signals from the accelerometers, a force-to-acceleration frequency response function matrix is computed by the processor 24. The matrix is inverted by the processor 24 so that the input is modeled as the sensor measurements and the output as the force.

Once Fourier converted into the spatial domain, the matrix is used to derive a linear dynamic model in state-space to be used as the flexible part. The processor 24 applies differential equations to the frequency response function matrix to derive the linear dynamic model in state-space. The same is done with the strain gauge data using a force-to-compression or expansion frequency response function matrix. These linear dynamic models are combined to form the flexible part of the behavior model used by the state estimator. In alternative embodiments, the strain gauge signals are not used.

In another embodiment, the linear dynamic model in state space form is derived from a computer-aided engineering model (CAE) rather than trimmed-condition measurements. The modeling of the relationship of force to sensor signals is programmed or created using CAE.

The rigid part of the combined rigid-flexible car body model of the behavior model used by the state estimator is provided by the inertial measurement unit. The rigid part of the model is described by the equations of motion for a point mass. These give the position and velocity of the center of gravity of the body as a result to the applied interface forces. The state estimator uses these equations, so the corresponding states are the position and velocity of the center of gravity. The inertial measurement unit yields measurements of the position and velocity of the center of gravity. These are used to correct the estimates made by the state estimator. The signals from the inertial measurement unit or motion derived from the signals and a distance from the center of gravity to the unit represent the rigid motion of the car body. This information is included in the state estimator as the rigid part.

As discussed for FIG. 2 for estimating under handling conditions, the state estimator receives the signals from the sensors. The signals are received in real-time or recorded and later processed. In response to receiving the signals, the state estimator updates the measurements and then updates the behavior model as a Kalman filter. The state estimator outputs forces for each connection point or other sampled locations. The forces are for a point in time, over time, integrated to represent change in force, double integrated, or otherwise represented. In one embodiment, a force vector as a function of time is output for each of the forces. The processor 24 outputs the forces to which the connection points are subjected by the suspension.

The output is to the memory 26, the display 28, or as a transmission over a computer network. The processor 24 generates an image, such as a chart, graph, spreadsheet, or list. A graphic representing the location of the force and/or other state information (e.g., rigid motion) may be output. A signal or signals from one or more sensors may be output.

The sensor signals, information derived from sensor signals, the behavior model, FRF, CAE model, forces, state information, state estimator, instructions, user input, rules, and/or other information are stored in a non-transitory computer readable memory, such as the memory 26. The memory 26 is an external storage device, internal storage device, RAM, ROM, and/or a local memory (e.g., solid state drive or hard drive). The same or different computer readable media may be used for the instructions and other data, such as the sensor signals, models, and forces. The memory 26 may be implemented using a database management system (DBMS) managed by the processor 24 and residing on a memory, such as a hard disk, RAM, or removable media. Alternatively, the memory 26 is internal to the processor 24 (e.g. cache). The memory 26 stores data used by or resulting from the particle-based fluid simulation.

The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Because some of the constituent system components and method steps depicted in the accompanying figures are preferably implemented in software, the actual connections between the system components (or the process steps) may differ depending upon the manner in which the present embodiments are programmed.

The display 28 is a liquid crystal diode (LCD), plasma, CRT, printer, or other display device. The display 28 connects with the processor 24 for receiving one or more images. The forces calculated by the processor 24 may be output to and shown on the display 28.

Figure 3:
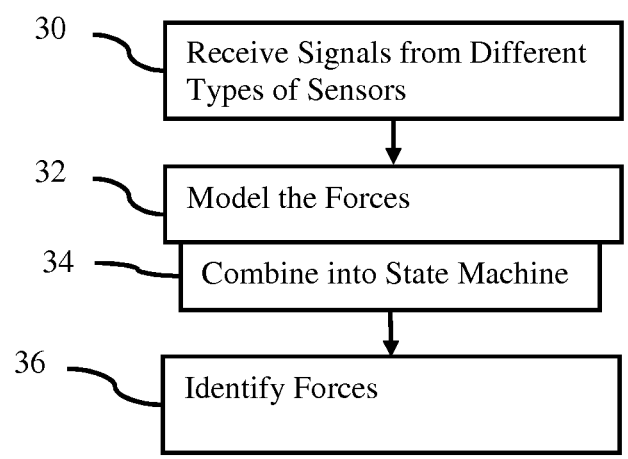
FIG. 3 is a flow chart diagram of one embodiment of a method for identifying forces in a vehicle interface.

FIG. 3 shows a method for identifying forces in a vehicle interface. The method is implemented by the system of FIG. 1, the augmented Kalman filter of FIG. 2, sensors on a car body and a processor, and/or a different system. A processor, interacting with sensors on a car body, performs the acts, such as pursuant to instructions, programming, or circuit design.

Additional, different, or fewer acts may be provided. For example, acts for building the state estimator or supporting models are provided. The method is performed in the order shown. Other orders may be provided.

In act 30, signals from sensors are received. The sensors are accelerometers and at least one rigid body sensor (e.g., inertial measurement unit or other device for indicating the motion of the center of gravity or global motion of the car body during handling). Signals from other sensors may be received, such as signals from strain gauges.

The received signals are raw or as produced by the sensors. Alternatively, the signals are filtered, decimated, converted from analog-to-digital, or otherwise processed. Information may be extracted from the signals, such as calculating a velocity, position, or change in position.

The signals are received wirelessly or via wires. The signals may be received directly from the sensors and/or indirectly from a buffer or other memory temporarily storing the signals.

The signals are received during handling of the vehicle. As the car body is subjected to forces from the suspension due to movement of the vehicle, the signals are collected. The processor receives the signals as the vehicle is operated on a road or other course. The processor may instead receive the signals at a later time, such as after completion of a road course.

The signals of the accelerometers and/or strain gauges are measures from or near connection points of the suspension with the car body. Any amount of oversampling may be used, such as having multiple of each of different kinds of sensors for each connection point. Since acceleration sensors merely require attachment to or near the connection point, acceleration sensors may be more rapidly installed than strain gauge sensors. Accordingly, the number of strain gauge sensors per connection point is limited, such as one per force, and acceleration sensors are used instead. In alternative embodiments, one or more of the sensors are spaced from a connection point, such as being spaced by more than 10 cm. Sensors at or near the connection points are within 10 cm of the connection point, such as being with 5 cm, 1 cm, or contacting the connection point.

In act 32, the forces relation to flexing at the vehicle interface of the suspension and car body is modeled. Two or more, such as at least three, types of sensors are used for the modeling. For example, strain gauges, accelerometers, and an inertial measurement unit are used. The signals from these sensors received in act 30 are used for modeling the forces.

A rigid-flexible car body model is applied. The model is applied using a state machine. For example, an augmented Kalman filter uses the signals from the sensors and a behavior model (e.g., the rigid-flexible car body model) to estimate the forces that cause the sensor signals. The state of the car body and corresponding forces is estimated. The processor implementing the state machine combines, in act 34, the sensor signals and rigid-flexible car body model. The combination outputs forces.

The behavior model is created for a specific vehicle. Each vehicle of a same type has its own behavior model. Alternatively, the same behavior model is created and used for multiple vehicles of the same type.

The behavior model is created as a linear dynamic model in state space. The linear dynamic model is derived from a force-to-acceleration frequency response function matrix. The matrix is created by measuring sensor responses to known forces. Similarly, a force-to-deformation frequency response function matrix may be used as well. The matrix is inverted in the frequency domain so that force is an output instead of an input, converted to the time domain, and then differential equations are used to derive the linear dynamic model in state space.

Alternatively, the linear dynamic model is derived from a computer-aided engineering model. The materials, characteristics of the materials, dimensions, connector information, and other information are used to estimate the relationship between force and acceleration and/or between force and deformation at connection points based on the computer-aided engineering model.

Based on the combination of both rigid information (e.g., global motion of the car body) and flexible information, the forces may be modeled from the sensor signals. The acceleration measured by accelerometers includes acceleration from local deformation of the car body as well as acceleration from the global motion of the car body. By accounting for the rigid motion, the effects of the global motion on the accelerometers is reduced or removed. The remaining information indicates the acceleration from the local flexing or deformation. The model combines both the rigid and flexible acceleration in the model to isolate local forces for the flexing of the car body.

In act 36, forces acting on the car body from the suspension during handling are identified. The processor receives the signals, inputs the signals to the model, and generates the estimates of the forces with the state machine using the model. The forces are calculated by the processor using the combination of the state machine and the received signals.

The magnitude and/or direction of forces to which the car body is subjected at connection points or other locations are estimated. The type of force (e.g., shear verses strain) may be estimated or derived from the estimated forces. Forces at a given time or over time are estimated.

The estimates of the forces are displayed. The estimates are displayed as values. Bar graphs, vector representations, charts of magnitude over time, spread sheets, or other representation of a given or each force may be used. Information may be calculated from the force or forces and displayed. For example, forces in different directions at a same connection point are combined to determine a direction of the force. As another example, a twist, bend, or other distortion in three dimensions is determined from the estimates of one or more forces. A graphic or other information representing the information calculated from forces may be displayed. In alternative embodiments, the forces or information derived from the forces are stored or transmitted.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for identifying forces in a vehicle interface, the system comprising:
   a processor;
   a plurality of strain gauges positioned on a car body by connection points of the car body with a suspension;
   a plurality of accelerometers positioned on the car body by the connection points;
   an inertial measurement unit connected with and on the car body, the inertial measurement unit comprising a position sensor;
   a memory comprising instructions and a combined rigid-flexible car body model, the instructions executable by the processor to cause the processor to estimate the forces at the connection points from the combined rigid-flexible car body model and input signals from the strain gauges, accelerometers, and inertial measurement unit, a rigid part of the combined rigid-flexible car body model responsive to signals from the inertial measurement unit, and a flexible part of the combined rigid-flexible car body model responsive to signals from the strain gauges and the accelerometers, the combined rigid-flexible car body model modeling behavior of motion of the car body as a whole with the rigid part and deformations of the car body with the flexible part.

2. The system of claim 1 wherein only one strain gauge is provided for each of the forces.

3. The system of claim 1 wherein the accelerometers have a frequency response of less than 200 Hz.

4. The system of claim 1 wherein the inertial measurement unit comprises global positioning unit and a gyroscope or accelerometer.

5. The system of claim 1 wherein the signals from the accelerometers are responsive to local deformations of the car body and rigid body motions of the car body, wherein the signal from the inertial measurement unit provides a position and velocity of a center of gravity of the car body as a result of the forces, and wherein the instructions executable by the processor further cause the processor to estimate the forces with cancellation of the rigid body motions using the signal from the inertial measurement unit in the rigid-flexible car body model.

6. The system of claim 1 wherein the instructions executable by the processor further cause the processor to estimate with the combined rigid-flexible car body model being in a state estimator with the signals from the inertial measurement unit and the accelerometers.

7. The system of claim 6 wherein the state estimator is an augmented Kalman filter configured to estimate the forces from the signals.

8. The system of claim 1 wherein a flexible part of the combined rigid-flexible car body model is responsive to a frequency response function computed from other signals of the accelerometers.

9. The system of claim 8 wherein the flexible part comprises a linear dynamic model in state-space form derived from the frequency response function.

10. The system of claim 1 wherein a flexible part of the combined rigid-flexible car body model comprises a linear dynamic model in state-space form derived from a computer-aided engineering model of the car body.

11. The system of claim 1 wherein the instructions executable by the processor further cause the processor to output the forces to a display.

* * * * *